United States Patent Office 3,073,868
Patented Jan. 15, 1963

3,073,868
PRODUCTION AND PURIFICATION OF
DIPHENYLOLALKANES
Walter H. Prahl, Buffalo, and Sol J. Lederman and Ellis I. Lichtblau, Kenmore, N.Y., assignors to Hooker Chemical Corporation, Niagara Falls, N.Y., a corporation of New York
No Drawing. Filed Feb. 5, 1959, Ser. No. 791,281
5 Claims. (Cl. 260—619)

This invention relates to the production of diphenylolalkanes and more specifically to the production of diphenylolalkanes of a high degree of purity.

Diphenylolalkanes are conventionally produced by the condensation of two mols of a phenol with one mol of an aldehyde or a ketone in the presence of an acidic substance. They can be prepared, however, by other methods also, such as, for instance, by the reaction, under the influence of Friedel-Crafts catalysts, of phenol with substances containing triple bonds.

In the specification and claims of this patent the terms "diphenylolalkane" and "gem diphenylol alkane" are used interchangeably and are intended to apply only to those compounds originally disclosed wherein two phenyl groups are attached to the same carbon atom. Further, it is to be understood that the aldehydes and ketones referred to herein are those compounds known in this art as "organic carbonyl compounds."

The most common representative of the class of the diphenylolalkanes is 2,2-(4,4'-dihydroxy-diphenyl) propane, frequently called bisphenol-A. It is normally prepared by the reaction of phenol with acetone under the influence of strong acids. Although the present invention is applicable to diphenylolalkanes in general, its application is explained in this specification mainly on the production and purification of bisphenol-A. The invention is, however, not limited in its application to bisphenol-A.

In the production of diphenylolalkanes in general, and of 2,2-(4,4'-dihydroxy-diphenyl) propane specifically, a number of impurities are formed. Such impurities may comprise, for instance, higher condensation products, containing, for instance three phenolic nuclei to two radicals of the ketone, and still higher condensation products in form of resins and tars, and condensation products having a composition similar to, or identical with, that of the diphenylolalkanes, but having different properties (possibly isomers, hemiacetals or similar compounds) and condensation products of the ketone with itself, and high molecular colored substances and others.

For the production of diphenylolalkanes very numerous processes are known which differ, among others, in the way in which they deal with these impurities.

Some processes do not attempt to separate these impurities at all. Their disadvantage is that all or most of the contaminants remain in the product, resulting in a bisphenol which contains as much as 20 mol percent impurities, as indicated by the freezing point, and a quantity of colored substances causing a pronounced yellow or brownish color of the product.

In other processes advantage is taken of the fact that in the condensation, a stage is reached where the desired product is present as a crystalline phase, normally as a slurry in mother liquor. Such processes separate these crystals from the mother liquor, thereby effecting a considerable degree of purification, especialy if such crystals are washed with solvents, such as water, phenol, etc. The disadvantage of such processes is their complication. By separating the crystals from the mother liquor the process flow is split into two parts, each of which requires its own separate further treatment. The impurities, although essentially removed from the crystals, accumulate in the mother liquor and pose the problem of removing them from it, before the valuable ingredients of the mother liquor can be recycled.

Other processes remove the impurities by recrystallizing the impure product from solvents. This process poses the problems of recovering solvents, recovering the product remaining, together with the impurities in the solvents, and is, in general, technically complicated.

It has also been suggested to purify the product by crystallization in form of its addition product with phenol, but again part of the product is left in the mother liquor of the process, part is left in the mother liquor of the recrystallization process and the valuable ingredients of both process parts have to be recovered, thereby making the process complicated.

It has also been suggested to purify the product by extraction with hot heptane or similar paraffinic hydrocarbons. Although this process is able to improve the quality considerably, it fails to remove most of the colored substances contained in the crude product, resulting in a finished product which is of low quality regarding color.

It would appear that a distillation of the crude product should result, as it does in many other cases, in a pure product, and this method of purification has been suggested a number of times. In carrying out the distillation it is obviously easy to remove low boiling contaminants, such as phenol, isopropyl phenol, isopropenyl phenol, etc., as well as the high boiling substances such as the higher condensation products, colored materials, traces of metal, etc. The distillation can be achieved by observing a number of necessary precautions, such as: Insuring the complete absence of acidic or alkaline substances and other materials such as certain salts, which could act as catalysts in the rapid decomposition of bisphenol to resinous matter; employing a very good vacuum; employing the shortest possible holding time in the evaporator; preferably using a thin-surface evaporator, etc. In spite of all these precautions, however, it is practically impossible to avoid a partial decomposition of the bisphenol. The distillate of even the most carefully distilled bisphenol contains certain quantities of a yellow resinous substance, having a slightly lower boiling point than bisphenol, and causing a low freezing point and unsatisfactory color.

All the above mentioned purification processes have, in addition to the many individual shortcomings, the one common disadvantage that the removal of the impurities lowers the yield of product considerably, as compared to the crude commercial product which contains up to 20 percent impurities.

The object of the present invention is to produce diphenylolalkanes of a very high degree of purity. A further object of the invention is to provide a simple economical method of purifying crude diphenylolalkanes containing impurities formed as by-products of the reaction. Another object of the invention is to provide a process for the production of diphenylolalkanes having a very high degree of purity at a yield essentially the same as that obtained in producing a crude product containing a considerable percentage of impurities. Other objects of the invention will become apparent in the course of the description.

The basic reasoning underling this invention is as follows: Although it appears tempting to base a purification on the voluntary appearance of crystals of bisphenol, or addition products of bisphenol with phenol, in the course of the condensation, any processes using this method of purification suffer from the necessity of separating these crystals by filtering and centrifuging, etc. in the presence of strong, highly corrosive acids, such as sulfuric or hydrochloric acid, of freeing the crystals of the last traces of such acids by washing, etc., and of working up the mother liquors consisting of excess phenol, water, acids, impurities, bisphenol, etc. in order to recover the valuable ingredients. Owing to these complications of processes attempting purification in the course of the condensation it is economically necessary to omit, except for precautions minimizing the formation of impurities, any attempt of purification in the course of the condensation, and to carry out the purification after a crude product containing essentially all of the impurities accumulated in the course of the condensation has been produced.

The main problem of this invention then was how to remove the impurities out of the crude product.

A partial solution to this problem was shown by the suggestion of Canadian Patent 551,049, now patented in the United States as U.S. 2,845,464, to extract crude bisphenol by means of hot paraffinic hydrocarbons, preferably heptane. This solution was only partially effective because, although by this method a considerable portion of the impurities can be removed, another portion, especially that comprising the colored materials, cannot be removed economically. The problem was then to find a solvent which has a much higher purifying ability than the paraffinic hydrocarbons, a solvent which, more specifically, is able to remove the colored impurities as well as the other impurities.

The properties postulated for this solvent are: It should be easily and economically accessible; it should have a low boiling point in order to permit an easy drying of the extracted product; and, as its most important property, it should have a high dissolving power for the colored materials combined with a low dissolving power for bisphenol. In searching for such solvent, it was found, however, that these criteria alone are not sufficient to define suitable solvents for the purification of diphenylolalkanes or bisphenol.

In this investigation, the purity of a diphenylolalkane or bisphenol product was expressed by two criteria, namely, freezing point and color. The freezing point was taken in the usual manner in a one inch test tube surrounded by an insulating jacket and using a thermometer divided into tenths of a degree, calibrated against an instrument normalized by the Bureau of Standards with stem correction applied. The color was characterized by measuring in a one-half inch cell of a "Spectronic 20" colorimeter, produced by Bausch and Lomb, the relative transparency of a 50 percent solution of the diphenylolalkane or bisphenol in ethyl alcohol to light of 350 millimicron wave lengths.

Table I shows several of the foregoing described properties when bisphenol-A or 2,2-(4,4'-dihydroxydiphenyl)propane was tested with various solvents.

TABLE I

| Solvents | Boiling point | Gms. bisphenol-A soluble in 100 gms. solvent | Gms. resin [1] soluble in 100 gms. solvent | Ratio of solubility of resin [1] to bisphenol-A | Extracted bisphenol | | |
|---|---|---|---|---|---|---|---|
| | | | | | Freezing point | Light transmittance | Yield, percent |
| Ethyl ether | 34 | 127.0 | 122.5 | 0.984 | | | |
| N-pentane | 36 | 0.0166 | 0.0462 | 2.69 | 152.2 | 3.3 | 94.0 |
| Methylene chloride | 40 | 0.859 | 68.43 | 79.7 | 156.8 | 64.5 | 86.6 |
| Cyclopentane | 49 | 0.0075 | 0.1593 | 21.2 | 151.8 | 6.0 | 94.9 |
| Acetone | 56 | 108.6 | 127.0 | 1.169 | | | |
| N-hexane | 69 | 0.0108 | 0.2175 | 20.01 | 152.0 | 3.5 | 94.5 |
| CCl$_4$ | 76 | 0.0369 | 0.726 | 19.58 | 153.3 | 4.0 | 92.4 |
| Ethyl acetate | 77 | 83.95 | 65.3 | 0.778 | | | |
| Benzene | 80 | 0.6105 | 98.60 | 161.5 | 156.8 | 68.0 | 87.1 |
| Cyclohexane | 81 | 0.0023 | 0.01534 | 6.68 | 152.8 | 3.5 | 94.3 |
| Ethylenedichloride | 83 | 0.9338 | 43.15 | 46.3 | 156.3 | 69.5 | 86.2 |
| Trichloroethylene | 87 | 0.077 | 87.15 | 1,132 | 155.5 | 17.0 | 89.0 |
| N-heptane | 98 | 0.0095 | 0.1687 | 17.76 | 154.1 | 3.2 | 91.9 |
| Methylcyclohexane | 100 | 0.0043 | 0.144 | 33.5 | 152.1 | 5.3 | 95.0 |
| Toluene | 110 | 0.3362 | 63.05 | 187.6 | 156.5 | 76.0 | 88.0 |
| Acetic acid | 118 | 21.61 | 65.2 | 3.02 | | | 20.0 |
| Chlorobenzene | 132 | 0.1194 | 98.70 | 826.2 | 156.4 | 39.0 | 88.7 |
| Xylene | 140 | 0.1645 | 89.05 | 541.5 | 156.4 | 69.7 | 88.6 |
| Cumene | 152 | 0.1346 | 4.48 | 33.3 | 156.2 | 26.0 | 88.6 |
| Ethanol | 78 | 150.5 | 74.6 | 0.495 | | | |
| O-dichlorobenzene | 180 | 0.1319 | 43.4 | 329 | 156.4 | 69.0 | 88.6 |
| Ethylene glycol | 182 | 75.0 | 54.48 | 0.732 | | | |
| Nitrobenzene | 210 | 6.49 | 13.52 | 2.08 | 155.8 | 3.3 | 75.0 |
| Trichlorobenzene | 213 | 0.0095 | 2.66 | 280 | 155.3 | 13.0 | 90.0 |
| Triisopropylbenzene | 234 | 0.682 | 1.44 | 2.11 | 153.3 | 3.2 | 90.0 |
| Glycerine | 290 | 18.38 | 2,693 | 0.1466 | | | |
| Original sample | | | | | 147.1 | 3.2 | |

[1] Typical and representative resinous material isolated from crude bisphenol.

Table I shows, in the first vertical column a number of different solvents so tested, arranged in ascending order of their boiling points, in the second column their boiling points, in the third column the solubility of bisphenol in them. The fourth column shows the solubility in them of a typical and representative resinous material of a brown color isolated from crude bisphenol. These solubilities were measured by saturating at room temperature each solvent with a slight excess of pure bisphenol-A or resin, respectively, separating the solution from the undissolved excess, evaporating a known quantity of the solution to dryness and weighing the residue. The sixth, seventh and eighth columns give the freezing point, the light transmittance, and the yield of product obtained by pouring 100 grams of a commercial grade of bisphenol-A, having a freezing point of 147.1 degrees centigrade, and a light transmittance of the 50 percent alcoholic solution of 3.2, into 200 grams of solvent, agitating the mixture for 3 minutes, separating the liquids from the solids in a Buchner filter with suction, washing the crystal in the filter with another 100 grams of solvent, drying the solid in vacuum, by gradually heating up to the melting point, and measuring the freezing point and light transmittance as previously described.

As expected it was found that all solvents which were tried, including those given in Table I as well as all others, gave a certain improvement in the quality of bisphenol-A, either in regard to color, in regard to freezing point, or in regard to both. Taking, however, the kind of improvement in freezing point and in color and especially in both simultaneously, and also the yield of product obtained, the ease of drying, and other factors into consideration, it was found that there are very vast differences between different solvents which make some of them outstandingly suitable, and others entirely unsuitable for the purpose of purifying bisphenol-A by solvent extraction.

Comparing first the solubility of bisphenol-A in different solvents with their ability to purify bisphenol-A, it is obvious that for optimum results the solubility must be within certain limits. Solvents in which the solubility, under the conditions applied, is less than 0.1 percent, give in general a good yield but a low quality of extracted bisphenol as demonstrated by freezing point and light transmittance. The reason may be that their low solvent power for bisphenol prevents them from penetrating into the crystal interstices. On the other hand, the solubility of bisphenol should not exceed a certain upper limit, because otherwise too much of the bisphenol is dissolved together with the impurities, resulting in a low yield.

Comparing next the ratio of solubility of bisphenol and of resinous impurity in a solvent, it is obvious that the theoretical conclusion that any solvent should be suitable in which this ratio of solubility is higher than one is not correct. It appears that for a practical, usable purification the ratio of solubility of bisphenol and resin in any given solvent should be at least 30 in order to make that solvent suitable for extraction.

Generalizing the results of the experiments given in Table I and other experiments, it was found that oxygen-containing solvents such as ethanol, acetone, acetic acid, etc. have a low degree of suitability, mainly because of their high solvent power for bisphenol. Paraffinic and cyclo-paraffinic hydrocarbons and their derivatives have also a low degree of suitability, by reason of their low solvent power for impurities. Some of the low boiling chlorinated hydrocarbons combine a low solvent power for bisphenol with a high solvent power for the resins, and thus are well suited for the purpose.

Of all the substances investigated the aromatic hydrocarbons show the best combination of vapor pressure, solvent power for bisphenol and for impurities. Among them benzene is the most suitable by reason of its high vapor pressure, low solvent power for bisphenol, high solvent power for impurities and easy accessibility. The solvents which emerged from these experiments as well suited for the purification of bisphenol are far superior in this respect to the paraffinic hydrocarbons suggested previously for that purpose.

The following three examples show the application of several solvents to the purification of bisphenol.

*Example 1*

One hundred grams of a commercial bisphenol-A in flake form, having a freezing point of 153.9 degrees centigrade and a relative transparency of 28 percent were mixed in a beaker with 200 grams of heptane, heated under constant agitation to 70 degrees centigrade and kept at this temperature under continued agitation for three minutes. The mixture was then filtered through a Buchner filter under vacuum, washed with 100 grams heptane, dried by heating it under vacuum of approximately one millimeter to its melting point, and then tested. The freezing point was found to be 155.4 degrees centigrade and the relative transparency 38.5 percent. Using a cryoscopic constant of 10 degrees centigrade depression for one mol of solute in 1000 grams of bisphenol, and taking the freezing point of the pure material as 157.3 degrees centigrade, the treatment with heptane had reduced the impurities of this commercial bisphenol from 7.2 mol percent to 4.15 mol percent, while the colored impurities were reduced in the ratio of 72 to 61.5.

*Example 2*

The same material was subjected to a treatment exactly the same in all details as in Example 1, except that instead of heptane, benzene was used and the temperature was 25 degrees centigrade instead of 70 degrees centigrade. This product showed a freezing point of 156.0 degrees centigrade and a relative transparency of 64.8 percent. The total impurities were thus reduced from 7.2 mol percent to 2.9 mol percent, giving about 40 percent improvement in the removal of all impurities over that effected by heptane, while the coloring materials were reduced in the ratio from 72 to 35.2, showing an improvement of the color removal of 350 percent effected by benzene over that effected by heptane.

This example and similar experiments with other solvents show that the solvents selected according to this invention in general and specifically benzene, are better suited than the paraffinic hydrocarbons for extracting the impurities in general and especially for extracting the color impurities from bisphenol-A.

*Example 3*

Example 2 was repeated in exactly the same form except that instead of heptane, methylenedichloride was used. A freezing point of 155.8 degrees centigrade and a color of 61.0 percent relative transparency were obtained. This example and similar experiments with other solvents prove that the solvent selected according to this invention, and specifically methylenedichloride are better extracting agents for impurities in general and especially for the colored impurities, than the heptane suggested before, and that a product of better quality is obtained by the present invention.

In the course of these experiments another unexpected observation was made which forms part of the present invention.

It is obvious that the rate and the degree of extraction of a solid by a solvent should depend upon the grain size of the solid. In addition, we made the surprising observation that in the case of the extraction of the impurities from bisphenol, for any given grain size the success of the extraction depends to a considerable extent upon the rate at which this material has crystallized. Crude bisphenol which had been crystallized quickly on water cooled flaking rolls was much less suitable for extraction than the same material of the same grain size which had been permitted to crystalize slowly, for instance in trays cooling by natural radiation.

*Example 4*

A sample of the same crude bisphenol with which Examples 1, 2 and 3 had been carried out, was molten, poured into a glass tray in a layer about one inch deep and permitted to crystallize in the course of about 10 minutes. It was then broken up, ground on a rotating knife mill and screened through a 10 mesh screen. The melting point of this product remained unchanged at 153.9 degrees centigrade, the color increased to a relative transparency of 20 percent. After extracting it with heptane exactly as described in Example 1, its freezing point was found to be 156.4 degrees centigrade and its relative transparency 48 percent, indicating a decided improvement over the figures obtained in Example 1 with otherwise the same material but cooled on flaking rolls.

*Example 5*

A sample of the same material as that used in Example 4 was extracted with benzene under otherwise the same conditions as in Example 2. It gave a freezing point of 156.6 degrees centigrade and a relative transparency of 72.4 percent. Comparison of Example 5 with Example 4 shows again the superiority of benzene over heptane. Comparison of Example 4 with Example 1, and of Example 5 with Example 2 shows that the result of the extraction of the slowly cooled material is better than of a material cooled fast as, for instance, on flaking rolls.

An explanation for the better extractibility of slowly crystallized material might be found in the assumption that in the slow crystallization larger crystals are formed, which do not include the impurities and which force the impurities to accumulate in less numerous but larger interstices than those formed in quick crystallization. We do not want, however, to be limited in our protection by the correctness or incorrectness of this explanation.

Example 6

This example serves to show the effect of distillation upon crude bisphenol. A sample of the same crude bisphenol which was used in all previous examples was distilled with the shortest possible holding time under a vacuum of less than one millimeter in glass equipment. The distillate had a freezing point of 155.1 degrees centigrade and a relatively transparency of 39 percent.

This example shows that distillation removes a considerable portion of the impurities but is far from removing all of them. The reasons are probably two-fold: Firstly, some of the impurities present in the crude phenol, especially a yellow colored resinous material, possibly a hemiacetal, has the same or a very similar molecular weight as bisphenol and is close to its boiling point, so that a simple distillation does not separate it. Secondly, in the process of distillation, regardless of the precautions, colored decomposition products are formed.

According to the present invention a distillate so obtained can be further improved by extraction, and again extraction with the solvents as defined in this invention is more effective than extraction with paraffinic hydrocarbons.

Example 7

The distillate of Example 6 was permitted to crystallize slowly in a glass tray, was then ground and screened through a 10 mesh screen and the grains were extracted with heptane exactly as described in Example 1. The freezing point was 156.4 degrees centigrade and the relative transparency 50.3 percent.

Example 8

The grains prepared as in Example 7 were extracted with benzene exactly as in Example 2. The freezing point was 156.6 degrees centigrade and the relative transparency was 77.1 percent.

This series of examples shows that distillation improves the quality, but not to the point obtainable by extraction, that extraction of the distillate by means of benzene and other solvents defined in this invention is more effective than the extraction with heptane, and that in either case a better quality is obtained than by extraction of undistilled material. The combination of a distillation with an extraction is therefore part of the present invention.

Example 9

This example shows that methylenedichloride as an extracting agent has essentially the same advantages over the paraffinic hydrocarbons as benzene. Crude material in flake form, and passed through a 10 mesh screen, the same material molten, solidified, ground and screened to grains of the same dimension, and the same material distilled, crystallized, ground, screened and extracted with methylenedichloride using the same procedure as in all previous examples, gave the values

|  | Freezing point | Color |
| --- | --- | --- |
| Flake | 155.8 | 61.0 |
| Grains | 156.5 | 60.8 |
| Distilled grains | 156.5 | 77.6 |

The solvents filtered from the extracted material contain the impurities removed from the crude bisphenol, in solution. These impurities can be isolated and the impurities recovered in concentrated form by several methods such as crystallization, precipitation and others. We prefer to effect this separation by distillation.

Example 10

One thousand and one hundred and ten grams of crude bisphenol-A having a freezing point of 154.0 degrees centigrade, were extracted with 1500 grams of benzene, filtered, washed with 200 grams of benzene, extracted again with 1500 grams of benzene, filtered, washed with 200 grams of benzene and dried. One thousand and twenty-eight grams of product having a freezing point of 157.0 degrees centigrade were obtained. The combined benzene solution was evaporated and left a residue of 70 grams of resinous material. The quantity of bisphenol in the residue was too small for detection.

As this example and the yield column of Table I show, the removal of the impurities by extraction may result in a loss of weight of 10 to 15 percent or more of the impure product, depending upon the percentage of impurities originally present. This weight loss might make the process, as described so far, economically unattractive, if it were not for an entirely unexpected observation which also forms part of this invention:

It was observed that, if the impurities extracted from one batch of bisphenol are added to the ingredients of the next batch, the quantity of the impurities present in the product of that batch is about the same as that present in the product of the batch to which no impurities had been added. This surprising observation may be explained by assuming that either the impurities normally formed in the reaction are in equilibrium with bisphenol, and if they are added beforehand to the extent that they would be formed in this equilibrium, prevent the formation of new impurities, or by assuming that the impurities are of such a nature that in contact with phenol and/or ketone, and acid, they react with either the one or the other or both to form bisphenol. Still other explanations are possible, but we do not want to be limited in any way by any explanations of this phenomenon. For the present invention it is sufficient to state that the addition of the impurities recovered from the solvent to a production batch results practically in preventing the formation of further impurities and thereby in an unexpectedly high yield. In case the process is carried out continuously as we prefer to carry out our process, the impurities coming out of the solvent recovery still would, of course, be added continuously to the other ingredients being fed continuously into the reactor.

Example 11

In order to ascertain that even upon repeated recycling of the impurities no accumulation of them occurs, a series of experiments was run in which each following batch was made up from all the recovered phenol in the previous batch with the addition of enough fresh phenol to react with the acetone, and with the addition of all impurities recovered from the crude product of the previous batch by extraction.

Each batch was made as follows:

|  | Grams |
| --- | --- |
| Phenol | 2,905 |
| Acetone | 290 |
| 37 percent HCl | 200 | and whatever resin was isolated from the previous batch were weighed into a three neck flask provided with agitator, and gas inlet and outlet, kept in a water bath at 50 degrees centigrade. Gaseous hydrogen chloride was passed over the surface for 16 hours. Hydrogen chloride, water and excess phenol were removed by distillation under vacuum. Approximately 1220 grams of crude bisphenol having a freezing point of approximately 154.4 degrees centigrade were obtained. The resinous impurities were isolated by extraction with benzene, and recovered by vaporization of the solvent. The quantities of impurities obtained in six consecutive experiments are given in Table II.

TABLE II

| Experiment No. | Resin in grams | Resin out grams |
| --- | --- | --- |
| 1 | 110 | 123 |
| 2 | 123 | 83 |
| 3 | 83 | 174 |
| 4 | 168 | 70 |
| 5 | 70 | 73 |
| 6 | 73 | 60 |
| | 627 | 583 |

NOTE.—Difference, 44 grams.

This experiment shows, that in a series of six consecutive runs, no new resin was formed.

Examples 12 and 13 show that the method of purification described above specifically for 2,2-(4,4'-dihydroxydiphenyl) propane can also be applied to the diphenylolalkanes obtained by condensation of phenol with formaldehyde and with cyclohexanone. More generally it is observed that any of the diphenylolalkanes having melting points of more than 50 degrees centigrade can be purified by the methods of this invention.

Example 12

One hundred and forty-six grams of 37 percent formalin were added dropwise to an agitated mixture of 1000 grams of phenol, 1350 grams HCl 37 percent and 650 grams of distilled water over a period of 75 minutes. After two hours, the lower layer was withdrawn, the upper layer was washed with 2000 grams of distilled water and separated. The remaining organic material was subjected to distillation under two millimeters vacuum until a pot temperature of 150 degrees centigrade had been reached. Three hundred and seventeen grams of crude resinous dihydroxydiphenyl methane were obtained as a residue. One hundred and ten grams of this residue were subjected to distillation, and the fraction passing over between 180 degrees centigrade and 278 degrees centigrade at five millimeters was collected. The distillate weighed 83 grams. It had a freezing point of 126.0 degrees centigrade. Its light transmittance, measured as above, was 25 percent. Seventy grams of the distillate were extracted with 325 grams of benzene. Fifty-one grams of product were obtained having a freezing point of 138.7 degrees centigrade and a transmittance of 74 percent.

Example 13

Gaseous HCl was passed through a reaction mixture consisting of 2350 grams of phenol and 490 grams of cyclohexanone. It was kept at 50 degrees centigrade with agitation for 16 hours. Hydrochloric acid, water, and excess phenol were removed by vacuum distillation, leaving a residue of 950 grams of crude bisphenol-C (1,1-(bis-4-hydroxyphenyl) cyclohexane). The freezing point of this residue was 179.5 degrees centigrade, the transmittance of a 10 percent solution in ethanol to light of 350 m$\mu$ was two percent. One hundred grams of the crude material were ground, passed through a 10 mesh screen and extracted with 200 grams of benzene as described above. The extracted material had a freezing point of 186.7 degrees centigrade and 28 percent light transmittance.

Three hundred and sixty-six grams of the crude bisphenol-C were distilled under two millimeters pressure and a distillate weighing 344 grams was obtained.

The freezing point of the distillate was 180.4 degrees centigrade, its light transmittance as measured above was eight percent. A portion of the distillate was ground to pass a 10 mesh screen and was extracted with benzene, filtered and dried. Its freezing point was 188.2 degrees centigrade, its light transmittance 42 percent.

Examples 14 and 15 show our preferred method of preparing diphenylolalkanes of unusually high purity by means of extracting the impurities.

Example 14

Eighty parts/time of phenol, eight parts/time acetone and 1.2 parts/time of resin recovered by extraction of the product, are continuously saturated with 2.2 parts/time of gaseous hydrogen chloride and continuously fed to the first of three jacketed agitated reactors arranged in series and kept at 50 degrees centigrade. To the reacted material, leaving the third reactor, 130 parts/time of phenol are continuously added with agitation. The mixture is fed to the top of a column, in which essentially all hydrogen chloride, all water and part of the phenol are driven off under vacuum and recovered in a condenser, followed by a scrubbing tower for the absorption of the hydrogen chloride in weak hydrochloric acid. The mixture coming from the bottom of the column is fed through two vacuum columns in series, the first of which continuously distills and recovers the remaining phenol, while the second continuously distills the bisphenol-A and close-boiling impurities. A tarry residue is continuously discharged from the bottom of the second column. The distillate is continuously fed into a trough in which an internally cooled cylinder is rotating. A layer of crude bisphenol-A, having a freezing point of about 156 degrees centigrade, builds up to a thickness of about one-half inch. It is continuously removed by a blade, fed into a grinder, where it is reduced to a size passing through a 10 mesh screen, and fed continuously to an extractor. Here the material is continuously extracted by means of about 50 parts/time of benzene. The benzene containing the extracted impurities is recovered in a continuous atmospheric distillation, leaving about 1.2 parts/time of resin to be recycled to the reactors.

The extracted bisphenol-A is centrifuged and dried in vacuum. Thirty parts/time of bisphenol-A having a freezing point of 156.8+ degrees centigrade and a light transmittance as defined above of 75+ percent, are obtained.

Example 15

Essentially the same procedure is followed, except that, omitting the distillation step, the material from the crystallizing roll is fed to the grinder and further treated as above. The material obtained has a freezing point of 156.5+ degrees centigrade and a light transmittance of 50+ percent.

It is to be understood that the invention is not limited to the specific examples which have been offered merely as illustrative and that modifications may be made within the scope of the appended claims without departing from the spirit of the invention.

We claim:

1. A process for the recovery of 2,2-(4,4'-dihydroxydiphenyl)propane having a freezing point greater than 156.5 degrees centigrade from its crude reaction product, produced by the condensation of phenol with acetone in the presence of an acidic substance including the steps of (1) distilling the more volatile materials from the 2,2-(4,4'-dihydroxydiphenyl)propane, (2) vacuum distilling the 2,2-(4,4'-dihydroxydiphenyl)propane from materials less volatile in it, and (3) extracting the distilled 2,2-(4,4'-dihydroxydiphenyl)propane with an aromatic solvent selected from the group consisting of benzene, toluene and xylene, whereby 2,2-(4,4'-dihydroxydiphenyl) propane and a solvent solution of extracted impurities are separately produced.

2. The process according to claim 1 wherein the aromatic solvent is benzene.

3. A process for the recovery of 2,2-(4,4'-dihydroxydiphenyl)propane having a freezing point greater than 156.5 degrees centigrade from its crude reaction product, produced by the condensation of phenol with acetone in the presence of an acidic substance, including the steps of (1) distilling the more volatile materials from the 2,2-(4,4'-dihydroxydiphenyl)propane, (2) vacuum distilling the 2,2-(4,4'-dihydroxydiphenyl)propane from materials less volatile in it, (3) extracting the distilled 2,2,-(4,4'- dihydroxydiphenyl)propane with an aromatic solvent selected from the group consisting of benzene, toluene and xylene, whereby 2,2-(4,4'-dihydroxydiphenyl)propane and a solvent solution of extracted impurities are separately produced (4) recovering the extracted impurities from the solvent, and (5) recycling the extracted impurities for use as feed in the production of 2,2-(4,4'-dihydroxydiphenyl)propane.

4. A process for the recovery of 2,2-(4,4'-dihydroxydiphenyl)propane having a freezing point greater than 156.5 degrees centigrade from its crude reaction product, produced by the condensation of phenol with acetone in the presence of an acidic substance, including the steps of (1) distilling the more volatile materials from the 2,2-(4,4'-dihydroxydiphenyl)propane, (2) vacuum distilling the 2,2-(4,4'-dihydroxydiphenyl)propane from materials less volatile in it, (3) crystallizing the molten distilled 2,2-(4,4'-dihydroxydiphenyl)propane, (4) breaking up the crystallized mass into grains, and (5) extracting the distilled crystallized 2,2-(4,4'-dihydroxydiphenyl)propane with an aromatic solvent selected from the group consisting of benzene, toluene and xylene, whereby 2,2-(4,4'-dihydroxydiphenyl)propane and a solvent solution of extracted impurities are separately produced.

5. A continuous process for the production of 2,2-(4,4'-dihydroxydiphenyl)propane having a freezing point greater than 156.5 degrees centigrade including the steps of (1) reacting one mole of acetone with at least three mols of phenol in the presence of hydrochloric acid and the reaction product extraction impurities recovered from step (6) below, at a temperature not exceeding eighty degrees centigrade until the acetone has been essentially consumed, to form a reaction mixture; (2) distilling substantially all the water, hydrochloric acid and unreacted phenol from the reaction mixture to form crude 2,2-(4,4'-dihydroxydiphenyl)propane; (3) vacuum distilling the crude 2,2-(4,4'-dihydroxydiphenyl)propane to form a distillate of 2,2-(4,4'-dihydroxydiphenyl)propane, extracting the said distillate with an aromatic solvent selected from the group consisting of benzene, toluene and xylene, whereby 2,2-(4,4'-dihydroxydiphenyl)propane and a solvent solution of extracted impurities are separately produced (5) distilling the solvent from the extracted impurities and (6) recycling the resultant extracted impurities to step (1).

References Cited in the file of this patent
UNITED STATES PATENTS

| | | |
|---|---|---|
| 1,760,758 | Korten | May 27, 1930 |
| 1,978,949 | Kohn et al. | Oct. 30, 1934 |
| 2,334,408 | Gump et al. | Nov. 16, 1943 |
| 2,455,535 | Tallman et al. | Dec. 7, 1948 |
| 2,464,207 | Bender et al. | Mar. 15, 1949 |
| 2,602,821 | Luten et al. | July 8, 1952 |
| 2,602,822 | Schwarzer et al. | July 8, 1952 |
| 2,617,832 | Martin | Nov. 11, 1952 |
| 2,669,588 | Deming et al. | Feb. 16, 1954 |
| 2,791,616 | Luten | May 7, 1957 |
| 2,845,464 | Luten | July 29, 1958 |
| 2,858,343 | Hoaglin et al. | Oct. 28, 1958 |
| 2,884,462 | Henry | Apr. 28, 1959 |